US006534565B1

(12) United States Patent
Gardner et al.

(10) Patent No.: US 6,534,565 B1
(45) Date of Patent: Mar. 18, 2003

(54) FRICTION FACING COMPOSITION AND METHOD OF MANUFACTURE

(75) Inventors: Thomas Haley Gardner, Englewood, OH (US); Robert Anthony Lamport, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/940,840

(22) Filed: Aug. 28, 2001

(51) Int. Cl.⁷ .................................................. C08J 5/14
(52) U.S. Cl. ..................... 523/149; 523/150; 523/153; 523/157; 260/998 B
(58) Field of Search ................. 523/149, 150, 523/153, 152, 155, 156, 157; 260/998.13

(56) References Cited

U.S. PATENT DOCUMENTS 4,324,706 A * 4/1982 Tabe et al. .................. 523/149
5,383,963 A * 1/1995 Kobayashi et al. ........... 106/36
5,891,933 A * 4/1999 Kasevan et al. ............. 523/158
5,894,049 A   4/1999 Lamport

OTHER PUBLICATIONS

Kirk–Othmer, Encyclopedia of Chemical Technology, ©1968, vol. 15, Phenolic Resins, pp. 176, 177, 203–205.

* cited by examiner

*Primary Examiner*—Edward J. Cain
*Assistant Examiner*—Katarzyna W. Lee
(74) *Attorney, Agent, or Firm*—Scott A. McBain

(57) ABSTRACT

Friction materials for clutch, brake shoes and the like are formed of a paper having reduced or eliminated non-functional processing additives. The paper composition includes components selected from a group consisting of aramid pulp, aramid staple, carbon/polyacrylonitrile fibers, glass wool, potassium octatitanate, bronze wool, high surface area filter cake, graphite, amorphous carbon and cyanated phenolic resin. The paper composition may be pre-compounded to a particle size in the range of 60 to 200 mesh. Part molding may be carried out by microwave heating the paper at 250° to 55° F.

21 Claims, No Drawings

FRICTION FACING COMPOSITION AND METHOD OF MANUFACTURE

BACKGROUND

In the manufacture of compositions for use as friction facings for brake shoes and clutch plates, including automatic transmission torque converter clutch plate applications, the friction composition is characterized generally as a paper-like article which is bonded to the metal shoe or clutch plate member. Generally, paper-like compositions contain several non-functional additives to aid in the manufacture thereof. Such additives are used to improve the retention of fine particles during the paper forming process, provide uniformity of the paper composition and increase the wet and dry strength and stiffness of the resulting paper sheet.

While so-called non-functional additives result in improved processing or manufacture of paper, they generally diminish the finished paper's physical properties. For example, almost all organic, non-functional processing additives used in paper manufacture tend to decompose at temperatures required for bonding the paper to clutch plates or similar structural members. Moreover, binding resin wetting of the fibers and particles of the paper composition is also severely compromised since the non-functional processing additives coat the outer surface of the paper fibers and particles and, during bonding, the resin bonds to the additive coatings and quickly cross links with such coatings. Subsequently, the non-functional processing additive layers begin to decompose leaving a gap between the now cured resin and the surface of the paper particles or fibers. The resulting paper composition thus has a porous microstructure which causes inferior tensile and shear strength of the composition, particularly for applications as friction brake or clutch facings, for example.

Accordingly, there has been a need to develop paper compositions and processes, particularly for applications such as friction surfaces, including transmission clutch plate applications, by providing a composition having superior wet and dry strength. It is to these ends that the present invention has been developed.

SUMMARY OF THE INVENTION

The present invention provides an improved paper composition, particularly adapted for friction surface applications including, for example, facings for automatic transmission torque converter clutch plates, brake shoes or disks and similar friction member applications. The present invention also provides an improved process for making a paper composition having superior wet and dry strength properties.

In accordance with one aspect of the present invention, a paper composition is provided which includes a powdered binder that melts during the paper drying process and replaces typical latex based adhesives. The binder is also used to bond the resulting paper sheet to support structure in applications of the paper sheet as clutch plate friction facings, for example. The binder is typically present in the paper composition in weight quantities substantially greater than prior art adhesive additives. In forming the paper, the wet strength is further increased using conventional paper making methods of vacuum extraction and warm rolling, for example. These processes serve to densify the paper sheet and allow the melted binder to flow. Moreover, fine particle retention is improved by precompounding at least some of the components of the paper composition with the binder wherein the precompounded composition may then be ground to a diameter comparable to the mesh size of the screen used in the paper forming apparatus. In this way, the fines of the composition may be efficiently trapped during formation of the paper without the need for further additives, including flocculents.

The present invention still further provides an improved process for making paper material particularly useful for power transmission equipment friction surfaces, for example, which process eliminates the requirement for liquid resin saturation of the material, results in relatively low outgassing during formation of the material and results in friction material with improved strength, more uniform density, improved resin bonding to the fibers and particles of the paper composition and allows heating to partial or fully cure the resin and the paper composition to a final density while also bonding the material to clutch plates, disks or similar structures used in mechanical power transmission and brake equipment.

Those skilled in the art will further appreciate the advantages and superior features of the invention, together with other important aspects thereof upon reading the detailed description which follows.

DETAILED DESCRIPTION OF THE PREFERRED EMBODIMENTS

The manufacture of papers used for friction materials normally requires compositions which include large quantities of thickeners, such as guar, alum, starch and certain flocculents. Dispersed latex adhesives are also often used and are particularly detrimental to applications of papers for friction materials, such as brake linings and clutch plates, for example.

Heretofore papers used in forming friction faces on clutch plates and the like have been saturated with liquid resin prior to bonding the paper articles to the supporting structure, such as a clutch plate or disk. Moreover, during the curing or bonding phase at elevated temperatures, so-called nonfunctional or processing additives used in forming the paper bond to the resin coating and then often decompose, leaving a minute gap or space between the cured resin and the particles and fibers which make up the paper composition. This action results in a friction material with inferior tensile and shear strength and, consequently, a short working life.

Moreover, conventional paper manufacturing processes have been used in forming papers for friction surfaces, such as brake linings and clutch plates. However, one important aspect of the invention comprises forming a relatively thick slurry in the paper making process. Slurries having 25% to 40% solids and particle sizes as large as 250 to 300 microns have been formed with negligible separation, even when the slurry is allowed to rest without agitation for substantial periods of time. The relatively thick slurries are also conducive to paper making processes of the so-called pulp mold type, which processes may be advantageously used in the manufacture of articles such as ring shaped clutch plates or brake discs while minimizing waste of the paper material.

In accordance with the invention, paper compositions have been developed which have eliminated many nonfunctional processing additives in the compositions. Still further, the improved paper compositions have been precompounded with binding resins, particularly cyanated phenolic resins, for example. The resin is precompounded with the other materials making up the paper composition and in the precompounding step, the resin and other materials making up the composition are ground to a diameter comparable to the mesh size of the screen of the paper making apparatus. Accordingly, the paper particles may be efficiently trapped by mechanical filtration and without the need for modifiers and flocculents in the paper composition.

The ingredients of the following examples were precompounded to particle sizes of about 60 mesh (250 micrometers). Particle sizes substantially larger than 60 mesh are not efficiently dispersed and particles smaller than about 200 mesh are not efficiently trapped unless a 150 mesh screen and/or a thick paper sheet (>.55 grams per square inch) is formed. Accordingly, the precompounded particle size distribution is −60/+200 mesh, preferably centered at 100 mesh. Smaller particles are efficiently trapped as soon as a mat of the bigger particles is deposited on the paper making screen.

In the examples below precompounding was carried out with a cyanated phenolic resin commercially available as composition CT 90 from Lonza, Inc., Annadale, N.J. This resin is free flowing at room temperature and is an excellent choice for a free resin addition to the composition or a very lightly loaded precompound without the need for a partitioning agent. Precompounding may be carried out in a cryo mill, although not necessary, and may be carried out with a low resin content wherein the remainder of the resin may be introduced as another powdered phase during the actual paper making process. Several advantages are realized. The melt flow viscosity of the precompounded material is not substantial. The fines tend to stay as isolated islands while the resin squeezes out to coat the nearest particles. Resin content can be reduced by about 20% without adversely affecting the precompounding process.

The following examples were formed by hand and using a Rotoformer type paper manufacturing apparatus with a premixing tank, including a motor driven, high pitch, relatively short blade propeller type mixer, having a geometry not unlike an outboard motor type propeller.

EXAMPLE 1

The composition of paper sheets made according to this example included the following ingredients by weight percent as indicated: aramid pulp-4.2%, 95% carbon/polyacrylonitrile 0.25 inch fiber particles-6.8%, glass wool-3.6%, potassium octatitanate fiber-28.8%, bronze wool-9.5%, oxide-16.8%, graphite-5.9%, amorphous carbon-0.9% and a mix of solid lubricants, abrasives and fillers selected from a group consisting of zirconia, cashew fruit or cashew nut shell resin, phenolic resin, antimony sulfide, barium sulfate and phenolic resin-23.4%, of which the CT-90 cyanated phenolic resin makes up 10.5% by weight of the total composition.

EXAMPLE 2

Paper sheets were formed in the same manner from a composition comprising the following ingredients by weight percent, as indicated: aramid pulp-11.8%, aramid staple-3.0%, oxide-37.8%, graphite-11.6%, amorphous carbon (crystalline or non-crystalline carbonaceous material)-2.6% and a mixture of the above-described ingredients including cyanated phenolic resin totaling 8.3% by weight of the total composition.

EXAMPLE 3

A third example of paper sheet was formed using the same Rotoformer type paper making apparatus and a mixer of the type described above. This example included the following ingredients by weight percent, as indicated: 95% carbon/polyacrylonitrile fibers 0.25 inches length-21.4%, HS95C high surface area mineral fiber filter cake from Fibrox Technology, Ltd., Thetford Mines, Quebec-34.6%, graphite-10.6%, amorphous carbon-2.4% and a mixture of solid lubricants, and abrasives selected from a group consisting of zirconia, cashew fruit or nut shell resin, antimony sulfide, barium sulfate and cyanated phenolic resin 31.0%, of which the cyanated phenolic resin comprised 8.3% to 10.5% by weight of the total composition.

The compositions described above in connection with Examples 1 through 3 may be modified. For example, the aramid pulp, aramid staple or carbon/polyacrylonitrile fibers may be provided in a weight percentage of the total composition of about 3.0 to 25.0. Still further, the cashew fruit or cashew nut shell resin may be provided in a weight percent of from 2.0 to 10.0 of the total composition. Still further, the binding resin may be selected from a group consisting of cyanated phenolic resin, phenolic resin, pitch and polyamide. One or more abrasives may be included and selected from a group comprising zirconia, zircon sand, aluminum oxide, iron oxide or magnesium oxide in a weight percent of 2.0 to 25.0. Inorganic fillers and dry lubricants may be selected from a group consisting of calcium carbonate, barium-sulfate, and metallic sulfides such as antimony sulfide, tin sulfide, tungsten disulfide or molybdenum disulfide in an amount up to 10.0 percent of the total composition by weight. Still further, paper compositions in accordance with the invention may include graphitic and non-graphitic carbon in a weight percent of about 2.0 to 20.0 of the total composition.

Slurry uniformity may be improved by providing a shallow tank to reduce the amount of settling whereby the tank should be just slightly deeper than the bottom of the Rotoformer drum seal. The slurry could be fed through a series of high velocity tubes directly from the bottom of the tank to suspend any heavy particles. A feed tube angled at forty-five degrees to the surface would also serve to vector the slurry directly to the Rotoformer apparatus. A turbulator in the bottom of the tank also would serve to recirculate anything which has settled to the bottom. Still further, a direct feed line of heavier particles into a highly agitated slurry and aimed at the Rotoformer drum will increase the retention of the heavy particles by forcing them onto the Rotoformer screen, reduce the agitation necessary to keep the fines and fibers in suspension and improve retention of the fines by reducing detachment from the fibers by over-beating.

Longer fibers and larger flakes are retained better than shorter equivalents. Longer fibers improve wet and dry sheet strength. Scrap paper can be recycled prior to hot pressing, even up to about 25% by weight.

As mentioned previously, slurry additives are highly detrimental to the molding of the paper and are the main source of outgassing. Their effect can be reduced by preheating the slurry to flash off the organic materials but this raises the resin melt viscosity and drops the melt flow, increases porosity and ultimately lowers molded paper density. Increasing the latex and gum volume fraction also deteriorates paper density. These additives also interfere with resin bonding by forming a coating on the surface of the paper particles and fibers that the resin also tries to adhere to. Additives which are extremely thermally stable and flash off all water at low temperatures, such as fumed silica, may be used.

However, it has been discovered that slurry additives may be eliminated by selecting a screen size for the Rotoformer type paper making apparatus with a 150 mesh wire, which has been proven to provide 100% retention of greater than 150 mesh size particles. Particles smaller than the wire mesh size can be efficiently retained in a dual layer configuration of the paper. For example, a 150 mesh wire size can easily retain +400 mesh particles as long as a thin (approximately less than ⅓ of final sheet thickness) layer of +150 mesh size particles and fibers has already been deposited. A 160 mesh polymer screen has proven to provide excellent retention and easy release of the paper sheet during forming.

Elimination of processing additives may weaken the paper sheet. This can be compensated for by increasing the thickness. Hand made sheets have been produced at "density" of 0.086 g/cm² (80g deposited on a 144 in² surface= 0.55 g/in²). This could be increased by at least 30% if the paper is hot-rolled after drying. Thicker sheets have more contact points of fibers, and therefore more van Der Waals bonding to provide wet strength.

Retention and wet strength are both improved by increasing the size of fibers, particles and flakes. Short copper fibers (1 mm C-504) is too short to be intertwined with the pulp. C-504 grade copper chopped to a length from 4 to 12 mm has been successfully blended with no fallout.

Wet strength is also dramatically increased by switching to longer fibers of the same diameter. The aspect ratio is not as critical as the length. Wet strength was improved as rockwool length was increased from 150 $\mu$m (RB240) to 700 $\mu$m (RB280). The shorter length could not be made into a sheet by itself. By comparison, the 700 micron to 3000 micron lengths had enough wet strength to be picked up and waggled. Longer lengths (6–12mm) had poor flow and dispersion characteristics on the screen wire. Large variations in sheet thickness resulted, and the sheet failed within itself leaving too much retained on the wire. RB240 Rockwool has a 4 micron diameter and a typical length of 150 microns. RB280 has the same diameter, but an average length of 700 microns. The wet strength of the sheet with this single substitution (6.7 weight % of composition) became much better. The sheet could once again be handled, and was insensitive to drying time when being released from the screen.

Retention losses of carbons were virtually eliminated by converting from 200–600 micron needle 6208 graphite to either 1–2 mm needle or flake. The flake had much less top to bottom segregation, and flowed better during molding. Flakes are much less brittle than needles or spheres. Coke was completely replaced with the big flake graphite as well.

Converting the components in this manner increases the volume fraction that contributes to wet strength and retention from 10% (pulp only) to as much as 56% (pulp, carbons, copper, rockwool, $BaSO_4 \rightarrow$ large flake mica, $ZrO_2 \rightarrow$ rockwool, friction particle→6 mm oxidized PAN fiber). Even the first four components properly sized will provide a sheet with enough strength to be handled both wet and dry.

The majority of fines are lost at the beginning of water extraction. Trapping of fines becomes more efficient as the thickness of he material deposited on the screen wire grows. As observed from dual layer tests, 100% of −120 (125 $\mu$m)/+400 (37 $\mu$m) can be retained once a thin layer of material has been deposited on a 150 mesh wire. This means that the thicker the sheet, the greater will be the fraction of retained fines at any given combination of wire and particle size.

Releasing the sheet from the wire is easier when it is still quite damp. A dried sheet will stick regardless of mesh size (−60/+100 to −150) or wire composition (stainless or polymeric). Release from the wire is improved as fiber length increases. Fiber type determines maximum useable length. Pulps with a staple length greater than 2.5 mm are difficult to disperse. Rockwool (or other brittle fibers) longer than 3.0 mm form a slurry that does not disperse in the apparatus headbox and causes non-uniform sheet thickness. Copper particles longer than 4 mm creates hot spots during microwave heating of the paper. Oxidized polyacrylonitrile fiber as long as 6.0 mm can be used without incident.

After release from the screen wire, the paper sheet can be placed directly back onto the wire without further sticking. This is because the fibrils which oriented themselves perpendicular to the screen during draining will fold over and now lie parallel to the wire. A positive pressure air vent ducted under the screen during drying could be used to release the sheet without having to remove it when it is weakest.

The sheet loses its strength when dried (loss of Van derWaals bonding). This is compensated for by warm pressing the sheet during water extraction. This can be done during the normal drying cycle, and should not add any additional cost to the process. Sheet thickness is reduced by up to 50% as the pre-compounded particles melt and flow to bond the sheet together. This allows the paper to use the cyanated phenolic resin like its own adhesive, and provides a stiff, handleable sheet for cutting, pleating, etc.

The drying conditions of paper in accordance with the invention are important to its behavior. Laboratory handmade sheets were dried for 30 minutes at 280° F. By comparison, production rolls have only 7.5 minutes at a maximum of 340° F. (with auxiliary radiant heaters on) to complete drying. Actual pilot run rolls of paper were exposed to 270° F. for a total time ranging from 4.0 to 8.0 minutes. This discrepancy made for an enormous difference in behavior of the two papers during molding. Hand-made sheets could be hot-pressed in a positive cavity die at 470° F. for 8 minutes with one "breather" intermission at 45 seconds, and not outgas at all.

Heat aging production runs of paper to the same conditions as the hand-made sheets eliminated outgassing. Two rolls of paper were run through an entire bank of twelve heated steam cans (drying rolls) to dry the paper. The paper was actually in contact with each can for approximately 40 seconds. The paper was dried after running over only the fourth can.

Periods as short as two minutes of preheating dried paper at 310° F. were sufficient to significantly raise the resin melt-flow viscosity, and lower molded part density. Anything which contributes to the resin's thermal history must be accounted for. Overheating during drying may cause low density. Drying may require a rigorous specification of time and temperature to prevent density variation. Currently, three minutes preheat at 310°F. is sufficient to flash off all gases necessary to make a good part. It should be noted that the heat-up time for the paper in a convection oven is quite long. A thermocouple placed on the surface of the paper (lying one layer deep on a wire tray) required almost 1.5 minutes to reach 310° F. The temperature and time required to heat treat on steam cans will be shorter and cooler since contact heating is nearly instantaneous.

Melt viscosity of the cyanated phenolic resin is low enough that it will act like clay when molded to a pressure. Any additional pressure than what is needed for plastic flow does not further increase part density. Paper in accordance with the invention should be molded to a dimension, allowing for just enough plastic flow to fill out the mold cavity satisfactorily. Resin heat history controls the required preform die dimensions. Lower fill weights serve the same purpose. Mold vents are critical.

Paper in accordance with the invention can be deliberately pre-heated to partially crosslink the cyanated phenolic resin to a desired amount. This can be used to create one or more regions of low density to a molded part for controlled damping of the part with little effect on either wear life or compressibility. It can also be used to control taper wear by raising the wear rate at the inner diameter to match that of the outer diameter of cylindrical clutch plate or brake disc facings without changing friction materials compositions.

Impact frequency trials displayed a 1000 Hz shift in frequency when the part compressibility and density are varied. Furthermore, the level of damping could be increased by a factor of 2–3. As expected, an entirely dense part was stiffest, and had the highest frequency/lowest damping. A ⅔ dense, ⅓ soft part was almost as effective as an all soft one, but should have better wear characteristics. The resonant frequency and the damping can be tuned to improve the noise performance of the compound to the specific hardware configuration.

Although preferred embodiments of the invention have been described in detail herein, those skilled in the art will recognize that various substitutions and modifications may be made without departing from the scope and spirit of the appended claims.

What is claimed is:

1. A paper composition for friction facing of at least one of clutch plates and brake shoes, comprising:

carbon/polyacrylonitrile fibers in a weight percent of about 3.0 to 25.0 of the total composition; and a mixture of abrasives, inorganic fillers and dry lubricants, and a binding resin in a weight percent of about 20.0 to 56.0 of the total composition, said resin being selected from a group consisting of cyanated phenolic resin, phenolic resin, pitch and polyamide wherein said resin is present in a weight percent of about 8.0 to 11.0 of the total composition.

2. A paper composition for friction facings of at least one of clutch plates and brake shoes, comprising:

one or more fibers selected from a group consisting of aramid pulp, aramid staple and carbon/polyacrylonitiile fibers in a weight percent of about 3.0 to 25.0 of the total composition; and a mixture of abrasives, inorganic fillers and dry lubricants, and a binding resin in a weight percent of about 20.0 to 56.0 of the total composition, said resin being selected from a group consisting of pitch and polyamide wherein said resin is present in a weight percent of about 8.0 to 11.0 of the total composition.

3. The paper composition set forth in claims 1 or 2 including:

cashew nut shell resin in a weight percent of 2.0 to 10.0 of the total composition.

4. The paper composition set forth in claims 1 or 2 including:

at least one of potassium hexa-titanate and potassium octa-titanate in a weight percent of about 12.0 to 30.0 of the total composition.

5. The paper composition set forth in claims 1 or 2 wherein:

said abrasive is selected from a group consisting of zirconia, zircon sand, aluminum oxide, iron oxide and magnesium oxide in a weight percent of about 2.0 to 25.0 of the total composition.

6. The paper composition set forth in claims 1 or 2 wherein:

said inorganic fillers and dry lubricants are selected from a group consisting of calcium carbonate, barium sulfate, antimony sulfide, tin sulfide, tungsten disulfide and molybdenum disulfide in a weight percent up to about 10.0 of the total composition.

7. The paper composition set forth in claims 1 or 2 including:

crystalline and non-crystalline carbonaceous material in a weight percent of about 2.0 to 20.0 of the total composition.

8. The paper composition set forth in claims 1 or 2 wherein:

said abrasive is selected from a group consisting of zirconia and zircon sand in a weight percent of about 2.0 to 25.0 of the total composition.

9. The paper composition set forth in claims 1 or 2 wherein:

said inorganic fillers and dry lubricants are selected from a group consisting of calcium carbonate, tin sulfide and tungsten disulfide in a weight percent up to about 10.0 of the total composition.

10. A method for making a paper composition for a friction surface for at least one of a clutch plate and a brake shoe, comprising the steps of:

mixing materials comprising a composition according to claims 1 or 2;

forming a paper composition using said materials; and drying the formed paper.

11. The method set forth in claim 10 wherein:

the step of drying the formed paper is carried out at a temperature in the range of about 270° F. to 310° F.

12. The method set forth in claim 10 including the step of:

forming said paper on a wire screen having a mesh size of about 60 to about 200.

13. The method set forth in claim 12 wherein:

said paper is formed on a wire screen having a mesh size of about 160.

14. The method set forth in claim 10 wherein:

the step of forming said paper composition includes forming a slurry having a solids content of a weight percent of about 25 to 40 of the total composition.

15. The method set forth in claim 14 wherein:

said paper composition is formed into an article comprising one of a ring shaped clutch plate facing and a brake facing by pulp molding.

16. The method set forth in claim 10 including the steps of:

forming a part comprising one or more layers of said paper; and bonding said part to a surface of at least one of said clutch plate and brake shoe at a temperature of at least about 250° F.

17. The method set forth in claim 16 including the step of: heating said part by microwave energy.

18. The method set forth in claim 17 including the step of:

bonding said part to said surface by coating a surface of said part with said resin, confining said part and heating said part to a temperature in the range of about 300° F. to 550° F. for a time period of about 8.0 seconds to about 240 seconds.

19. The method set forth in claim 18 including the step of:

applying pressure to said part to urge said part into forcible engagement with said surface.

20. The method set forth in claim 10 including the step of:

providing said abrasive selected from a group consisting of zirconia, zircon sand, aluminum oxide, iron oxide and magnesium oxide in a weight percent of about 2.0 to 25.0 of the total composition.

21. The method set forth in claim 10 including the step of:

mixing with said materials an inorganic filler and dry lubricant selected from a group consisting of calcium carbonate, barium sulfate, antimony sulfide, tin sulfide, tungsten disulfide and molybdenum disulfide in a weight percent up to about 10.0 of the total composition.

* * * * *